United States Patent [19]

Pearre et al.

[11] 4,048,076
[45] Sept. 13, 1977

[54] CENTER COLUMN DRIVE ARRANGEMENT FOR CIRCULAR CLARIFIERS

[75] Inventors: Stephen G. Pearre, Essex; Bobby L. Craighead, Baltimore, both of Md.

[73] Assignee: Environmental Elements Corporation, Baltimore, Md.

[21] Appl. No.: 644,827

[22] Filed: Dec. 29, 1975

[51] Int. Cl.² .............................................. B01D 21/06
[52] U.S. Cl. .................................... 210/528; 210/520
[58] Field of Search ............... 210/513, 520, 528, 519, 210/531

[56] References Cited

U.S. PATENT DOCUMENTS

| | | | |
|---|---|---|---|
| 2,724,506 | 11/1955 | Hardinge | 210/528 |
| 2,881,922 | 4/1959 | Kelly | 210/520 |
| 3,216,570 | 11/1965 | Cunetta | 210/528 X |
| 3,295,835 | 1/1967 | Klopper | 210/528 X |
| 3,539,051 | 11/1970 | Stone | 210/520 |
| 3,542,207 | 11/1970 | Stansmore | 210/520 |

*Primary Examiner*—Frank W. Lutter
*Assistant Examiner*—Richard L. Chiesa
*Attorney, Agent, or Firm*—Herbert J. Zeh, Jr.; Oscar B. Brumback

[57] ABSTRACT

A fixed center column supports axially a torque cage mounted to a first bearing on the column, and a second bearing is disposed between the torque cage and a supporting walkway or superstructure. A powered drive unit is mounted to the walkway and has a drive shaft that is connected to the torque cage for rotation thereof about the axis of the center column.

4 Claims, 3 Drawing Figures

CENTER COLUMN DRIVE ARRANGEMENT FOR CIRCULAR CLARIFIERS

BACKGROUND OF THE INVENTION

The present invention relates to a clarification tank and more particularly to an improved center column drive mechanism for a circular clarification tank.

In clarifiers, and especially those that handle sediment type materials, it has been customary to provide a center column and to support thereon a rotatable torque cage that carries scrapers located close to the bottom of the tank. The torque cage is usually carried by a powered gear-drive assembly comprising a gear motor, pinion and an internal spur gear, all of which is enclosed in an appropriate gear housing.

Those skilled in the art know and understand the problems inherent in such a gear drive assembly. Accordingly, those skilled in the art will recognize and appreciate the improved center column drive arrangement of the present invention.

BRIEF SUMMARY OF THE INVENTION

A first bearing is mounted to a fixed center column of a clarifier tank and a torque cage is mounted to the bearing for rotation about the axis of the column. A second bearing is mounted to the torque cage and to a superstructure. Means for rotating the torque cage is provided.

For a further understanding of the invention and for features and advantages thereof, reference may be made to the following description and the drawing which illustrates a preferred embodiment of equipment in accordance with the invention.

DETAILED DESCRIPTION

Figure 1:
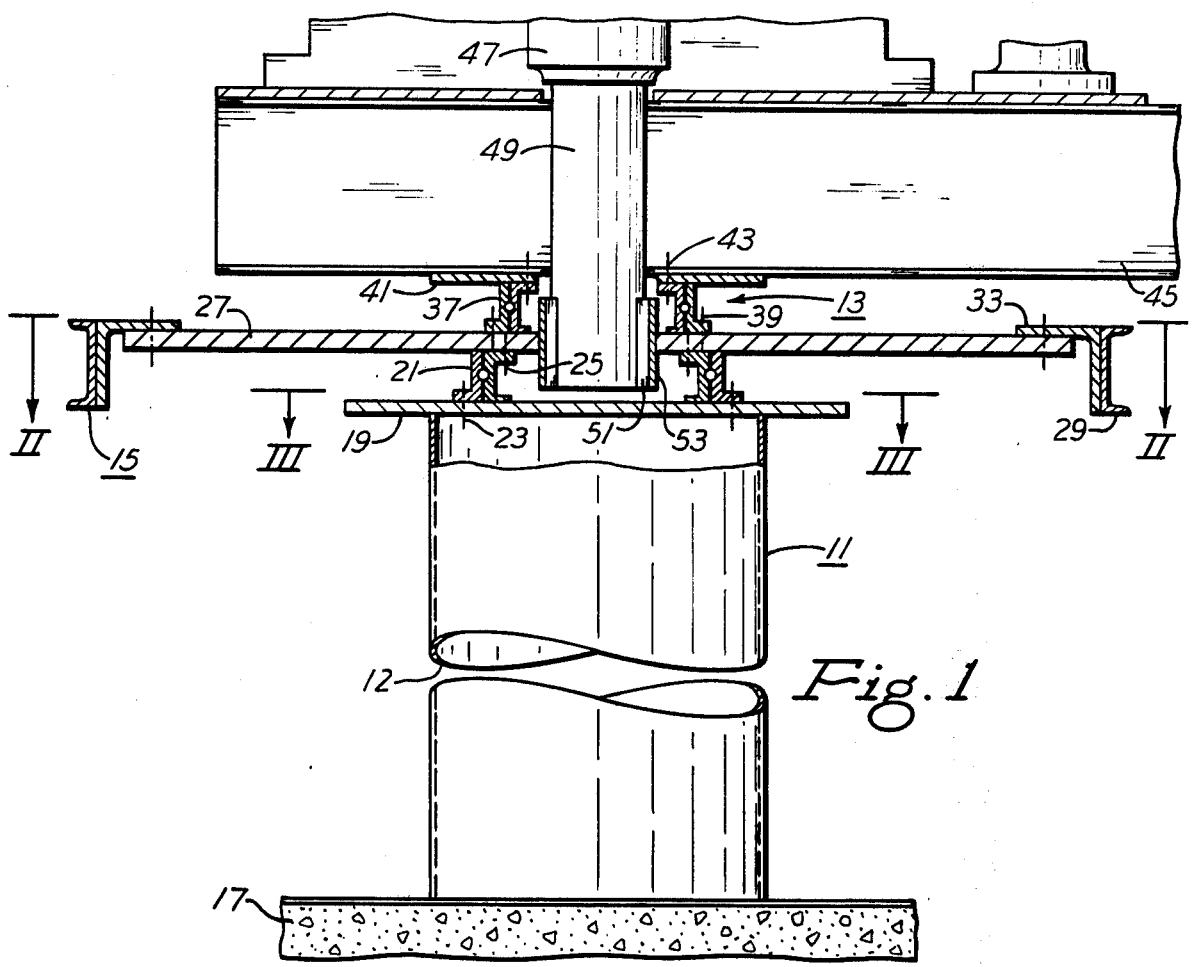
FIG. 1 is a schematic elevational view of a portion of a center column structure incorporating an improved drive arrangement in accordance with the invention.
Figure 2:
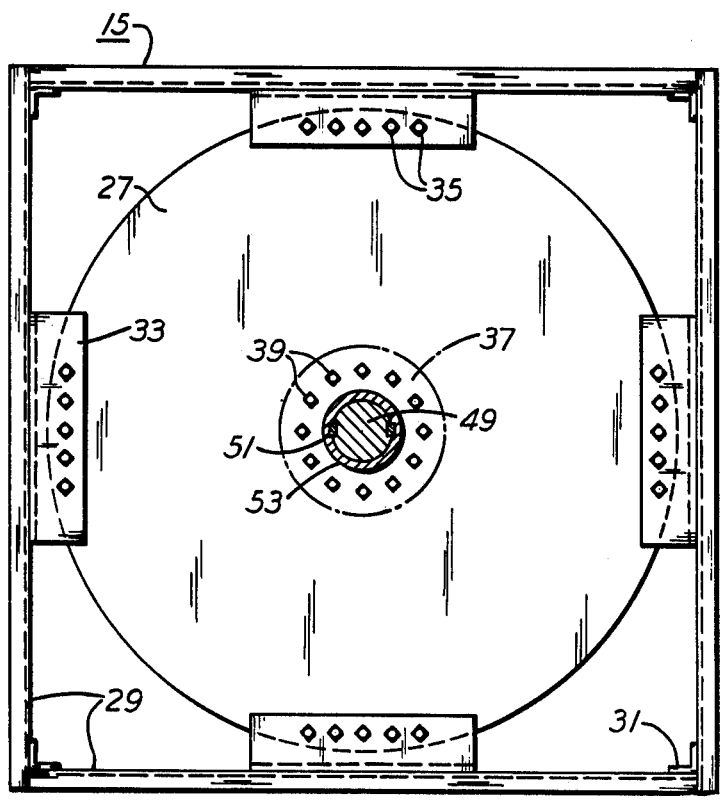
FIG. 2 is a view along line II—II of FIG. 1.

Referring to the drawing, FIG. 1 illustrates schematically an improvement in the center column structure 11 and drive arrangement 13 of a rotatable torque cage 15 mounted thereon.

Figure 3:
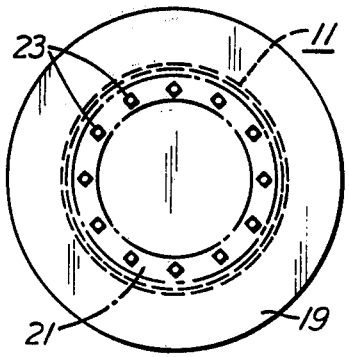
FIG. 3 is a view along line III—III of FIG. 1.

The center column structure 11 includes a cylindrical tubular member 12 that is mounted securely, in any suitable and conventional manner to the bottom of a clarifier tank 17. The center column 11 is capped by a circular horizontal flat plate 19 that is a base for a first bearing 21 bolted at 23, as shown in FIGS. 1 and 3, in a coaxial relation to the center column 11. A suitable bearing 21 is manufactured and sold under the trademark ROTEK by Rotek, Incorporated, Revenna, Ohio 44266. Of course, other bearings may be substituted therefor if suitable.

The bearing 21 is also bolted, as at 25, to another larger circular plate 27 to which is also secured the torque cage 15. The torque cage 15 is made up of four structural channels 29 that are suitably connected at their ends by structural angles 31. Midway along each side of the torque cage 15, is an angle member 33 that is suitably secured to the channel side member and that is also secured to the circular plate 27 by means of fasteners such as bolts 35.

Another bearing 37, similar to the bearing 21, is mounted to the circular plate 27 by suitable fasteners such as bolts 39, and the top of the bearing 37 is also secured to a plate 41 that is through-bolted by fasteners 43 to the underneath side of a structural member 45, known in the trade as the superstructure.

Supported on the superstructure 45 is a conventional powered cone-drive unit 47 having a vertical drive shaft 49 that is suitably keyed, as at 51, to a collar 53 welded or otherwise suitably fastened to the circular plate 27.

While not shown in the drawing, it will be understood by those skilled in the art that the drive unit 47 may include a conventional auto-rise mechanism that accomplishes the same result.

In operation, the torque cage 15 rotates upon the two sets of bearings under the influence of the powered cone-drive unit 47; the torque cage supporting the scraper arms of a conventional clarifier.

From the foregoing description of one embodiment of the invention, those skilled in the art should recognize many important features and advantages of it, among which the following are particularly significant:

That the two-bearing support of the present invention for the torque cage support plate is much simpler and less expensive than the conventional support for a torque cage;

That the torque cage drive unit can be easily and quickly removed without having to remove the conventional superstructure as in conventional clarifiers;

That the two-bearing and powered drive unit for the torque cage are easier to assemble and to maintain than conventional drive units of conventional clarifiers;

That the powered drive unit can be readily adapted, if desired, to include an auto-rise mechanism; and That the two-bearing and powered drive unit does not require the expensive pinion and internal spur gears of conventional torque cage drive units.

Although the invention has been described herein with a certain degree of particularity it is understood that the present disclosure has been made only as an example and that the scope of the invention is defined by what is hereinafter claimed.

What is claimed is:

1. An improved circular clarifier apparatus of the type including a tank having a fixed center column and having connected to the center column a torque cage rotatable about the center column and a superstructure, wherein the improvement comprises:

a. a first bearing axially mounted to the top of the center column;

b. the torque cage mounted to the top of the first bearing and rotatable about the axis of the center column;

c. a second bearing axially mounted to the top of the torque cage and connected to the bottom of the superstructure;

d. drive means for rotating the torque cage, the drive means having a vertical drive shaft extending through the center of the second bearing and keyed to the torque cage.

2. An apparatus as in claim 1 wherein the torque cage includes a plate mounted to the top of the first bearing and the bottom of the second bearing.

3. An apparatus as in claim 2 wherein the vertical drive shaft is keyed to a collar that is attached to the torque cage plate.

4. An improved circular clarifier apparatus of the type including a tank having a fixed center column and having connected to the center column a torque cage rotatable about the center column and a superstructure, wherein the improvement comprises:
  a. a circular bearing axially mounted to a plate affixed to the top of the center column;
  b. the torque cage having a circular plate mounted to the top of the first bearing, the torque cage being rotatable about the axis of the center column;
  c. a second circular bearing axially mounted to the top of the circular torque cage plate and connected to the bottom of the superstructure;
  d. drive means for rotating the torque cage, the drive means having a vertical drive shaft extending through the center of the second bearing and keyed to a collar attached to the torque cage plate.

* * * * *